United States Patent
Nishimura et al.

(10) Patent No.: US 9,269,973 B2
(45) Date of Patent: Feb. 23, 2016

(54) OPERATING METHOD OF FUEL CELL SYSTEM

(75) Inventors: Hidetaka Nishimura, Yokosuka (JP); Keigo Ikezoe, Ayase (JP); Masashi Sato, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 399 days.

(21) Appl. No.: 13/818,792

(22) PCT Filed: Sep. 27, 2011

(86) PCT No.: PCT/JP2011/071982
§ 371 (c)(1),
(2), (4) Date: Feb. 25, 2013

(87) PCT Pub. No.: WO2012/053324
PCT Pub. Date: Apr. 26, 2012

(65) Prior Publication Data
US 2013/0149627 A1    Jun. 13, 2013

(30) Foreign Application Priority Data
Oct. 21, 2010  (JP) .................................. 2010-236305

(51) Int. Cl.
*H01M 8/04* (2006.01)
*H01M 8/06* (2006.01)

(52) U.S. Cl.
CPC ...... *H01M 8/04343* (2013.01); *H01M 8/04223* (2013.01); *H01M 8/04231* (2013.01); *H01M 8/04365* (2013.01); *H01M 8/04388* (2013.01); *H01M 8/04447* (2013.01); *H01M 8/04753* (2013.01); *H01M 8/04955* (2013.01); *H01M 8/04164* (2013.01); *H01M 8/0662* (2013.01); *Y02E 60/50* (2013.01)

(58) Field of Classification Search
CPC ....................................................... H01M 8/04
See application file for complete search history.

(56) References Cited

U.S. PATENT DOCUMENTS

2005/0214617 A1    9/2005   Chapman et al.

FOREIGN PATENT DOCUMENTS

| CA | 2 744 304 A1 | 5/2010 |
|---|---|---|
| JP | 2000-277137 | * 10/2000 |
| JP | 2005-347151 A | 12/2005 |
| JP | 2008-097966 A | 4/2008 |
| JP | 2009-0265525 A | 2/2009 |
| JP | 2009-252634 A | 10/2009 |
| JP | 2010-123501 A | 6/2013 |

OTHER PUBLICATIONS

European Extended Search Report, Sep. 4, 2014, 6 pages.

* cited by examiner

*Primary Examiner* — Jacob Marks
(74) *Attorney, Agent, or Firm* — Foley & Lardner LLP

(57) ABSTRACT

Conventional fuel cell systems had the problem of impurity gases flowing back from a buffer tank and a reduction in the voltages of unit cells when the supply pressure of an anode gas is caused to pulsate at startup. An operating method include setting any one of the amplitude and cycle of the pulsation of the supply pressure of the anode gas to a fuel cell stack (FS) in accordance with the permeability of a nitrogen gas from a cathode side to an anode side. The method makes it possible to suppress unnecessary pulsation of the supply pressure of the anode gas at startup, and thus to maintain the concentration of a hydrogen gas in the fuel cell stack (FS) at an optimum level while preventing degradation in the mechanical strength of a membrane electrode structure that constitutes each unit cell (FC) of the fuel cell stack (FS).

7 Claims, 4 Drawing Sheets

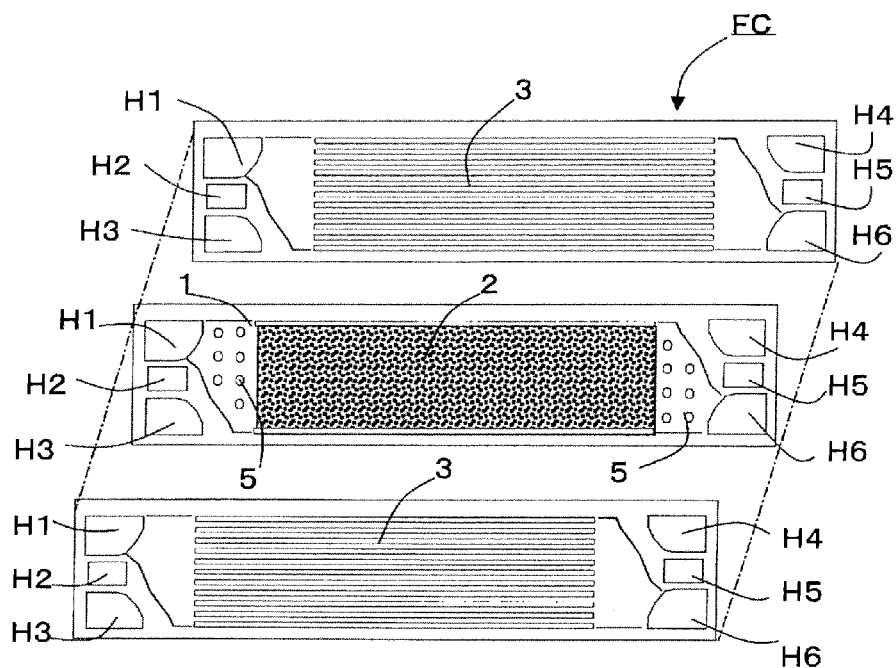
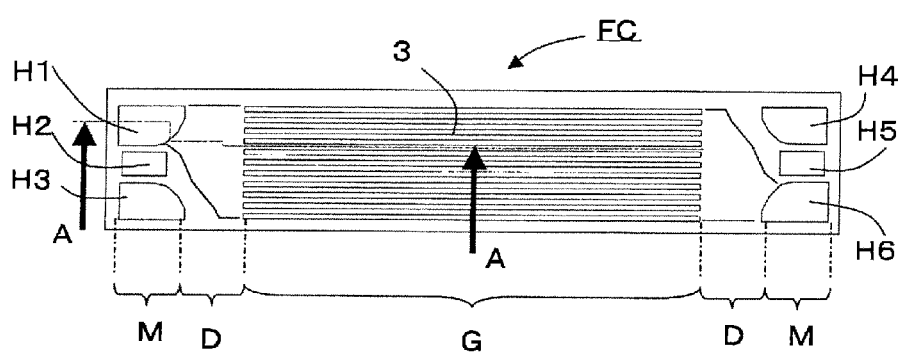

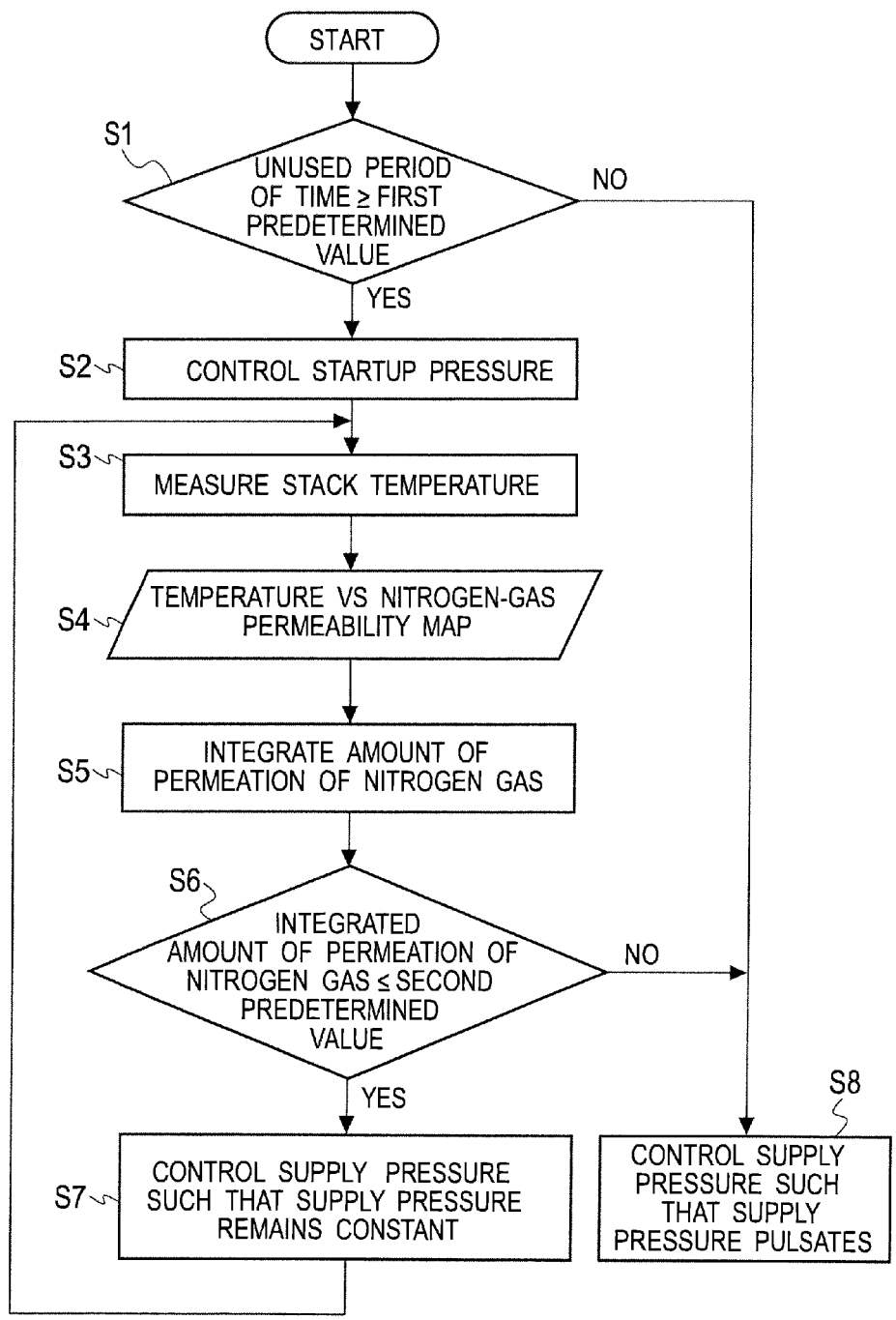

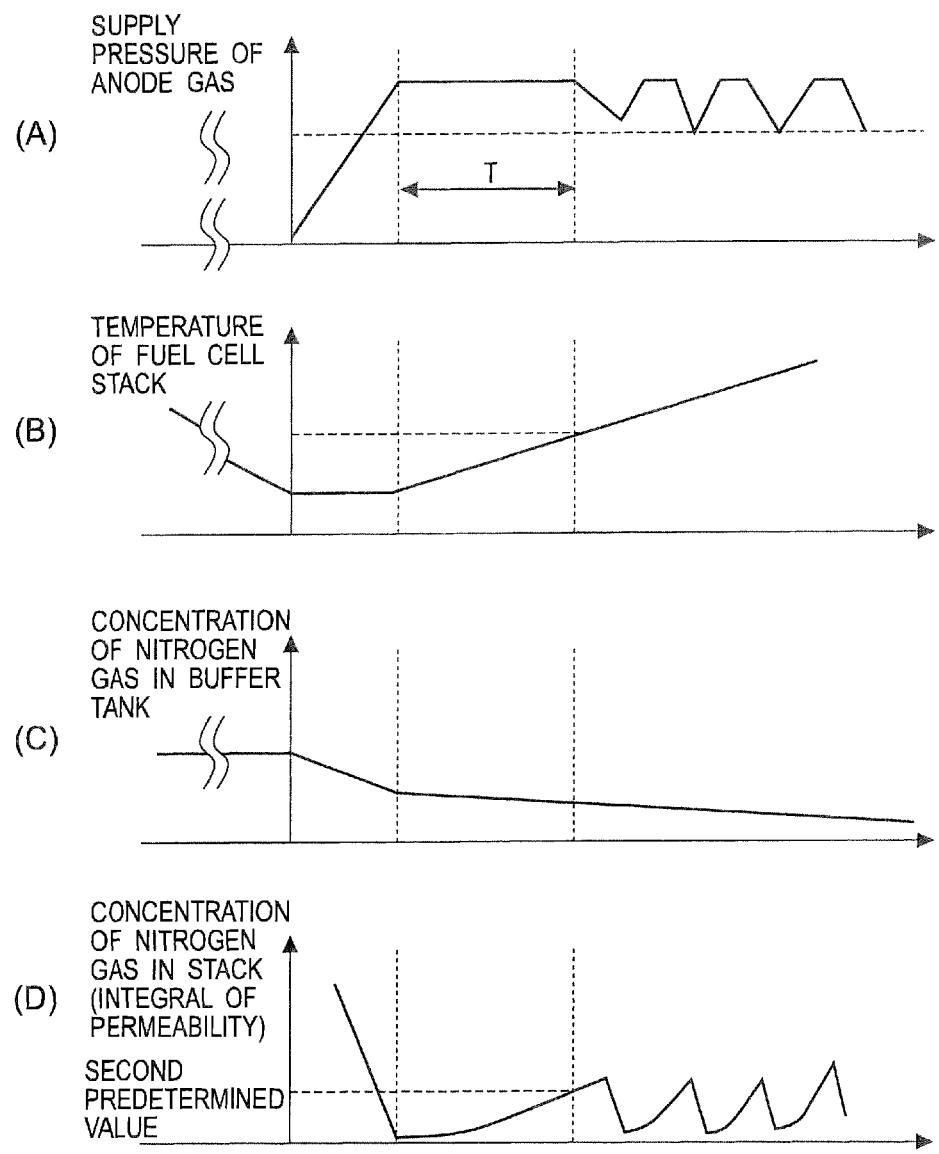

OPERATING METHOD OF FUEL CELL SYSTEM

TECHNICAL FIELD

The present invention relates to an operating method of a fuel cell system of a non anode-gas circulation type and relates particularly to an operating method of a fuel cell system preferably used at the time of startup of the system.

BACKGROUND ART

A fuel cell system described in, for example, Patent Literature 1 is a conventional fuel cell system of a non anode-gas circulation type. The fuel cell system described in Patent Literature 1 includes a fuel cell stack formed by stacking multiple unit cells, and also includes a hydrogen tank, a supply shut-off valve and a pressure regulation valve as a supply system for an anode gas to the fuel cell stack. Moreover, the fuel cell system includes a storage tank (buffer tank) and an exhaust shut-off valve (purge valve) as an exhaust system for an anode off-gas from the fuel cell stack.

The above fuel cell system sets a first control state where the amount of supply of the anode gas to the fuel cell stack is small and a second control state where the amount of supply is large, and switches the first and second control states back and forth. In other words, the supply pressure of the anode gas is caused to pulsate. Thereby, the fuel cell system reduces the accumulation of impurities in some of the unit cells, and pumps and exhausts the anode off-gas to the storage tank.

CITATION LIST

Patent Literature

Patent Literature 1: Japanese Patent Application Publication No. 2008-97966

SUMMARY OF INVENTION

Technical Problem

Meanwhile, fuel cell systems of a non anode-gas circulation type are such that an increase in the amount of permeation of impurity gases (mainly a nitrogen gas) from the cathode side to the anode side in the unit cell leads to an increase in the amount of the impurity gases accumulated on the anode side, as a matter of course. For this reason, the pulsation of the supply pressure of the anode gas like in the conventional case is effective in exhausting the impurity gases to the buffer tank and maintaining a high hydrogen concentration inside the fuel cell stack.

However, the necessity of the pulsation of the supply pressure of the anode gas is low when the amount of permeation of the impurity gases from the cathode side to the anode side is small. In this case, a high concentration of the impurity gases inside the buffer tank can lead to a problem that the impurity gases may possibly flow back upon lowering the pulsation pressure. There has been a need for a solution to this problem.

The present invention has been made in view of the above conventional problem, and an object thereof is to provide an operating method of a fuel cell system capable of suppressing unnecessary pulsation of the supply pressure of an anode gas at the time of startup in a fuel cell system of a non anode-gas circulation type to thus maintain the concentration of a hydrogen gas inside a fuel cell stack at an optimum level.

Solution to Problem

An operating method of a fuel cell system of the present invention is a method for operating a fuel cell system of a non anode-gas circulation type that includes: a fuel cell stack formed by stacking multiple unit cells; and a buffer tank for exhausting, to the outside, an impurity gas contained in an anode off-gas exhausted from the fuel cell stack, and the fuel cell having a structure in which the impurity gas inside the fuel cell stack is pumped to the buffer tank by causing pulsation of a supply pressure of an anode gas to the fuel cell stack, In addition, the operating method of the fuel cell system is characterized in that the operating method includes the step of setting any one of an amplitude and cycle of the pulsation of the supply pressure of the anode gas to the fuel cell stack in accordance with the permeability of a nitrogen gas from a cathode side to an anode side.

In a more preferable embodiment, the operating method of the fuel cell system is characterized in that control is performed such that the supply pressure of the anode gas to the fuel cell stack remains constant, in a case where the permeability of the nitrogen gas from the cathode side to the anode side is equal to or smaller than a predetermined value.

Advantageous Effect of Invention

According to the operating method of fuel cell system of the present invention, it is possible to suppressing unnecessary pulsation of the supply pressure of the anode gas at the time of startup in a fuel cell system of a non anode-gas circulation type to thus maintain the concentration of a hydrogen gas inside the fuel cell stack while preventing degradation in the mechanical strength of a membrane electrode structure that constitutes each unit cell.

BRIEF DESCRIPTION OF DRAWINGS

FIG. 2 is a plan view of an exploded state of a unit cell for the purpose of describing the unit cell.

FIG. 3 is a plan view of the unit cell for the purpose of describing the unit cell.

FIG. 4 is a flowchart describing an embodiment of an operating method of the fuel cell system.

FIG. 5 is a set of graphs respectively showing the supply pressure of an anode gas at startup (Part (A)), the temperature of a fuel cell stack (Part (B)), the concentration of a nitrogen gas inside a buffer tank (Part (C)), and the concentration of the nitrogen gas inside the fuel cell stack (Part (D)).

DESCRIPTION OF EMBODIMENTS

Figure 1:
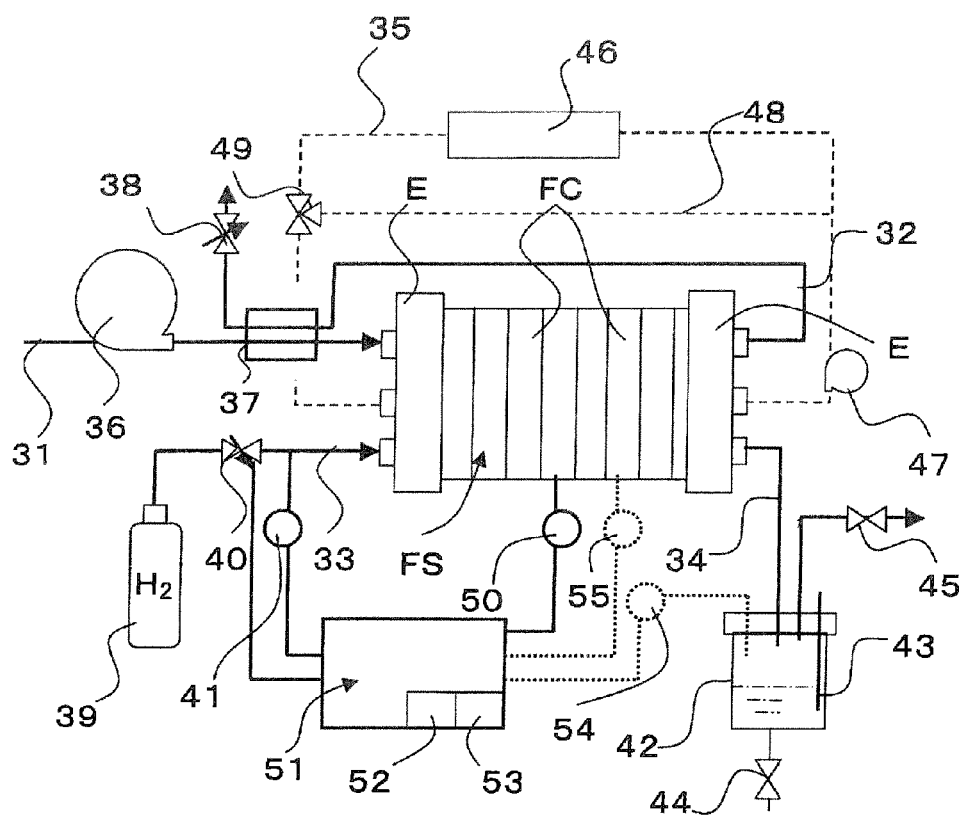
FIG. 1 is an explanatory diagram showing an embodiment of a fuel cell system of a non anode-gas circulation type.

FIG. 1 is a diagram showing an embodiment of a fuel cell system to which an operating method of fuel cell system according to the present invention is applicable. The illustrated fuel cell system is a system of a non anode-gas circulation type in which an anode gas flows in one direction from a supply side to an exhaust side.

The fuel cell system includes a fuel cell stack FS formed by stacking multiple unit cells FC, and also includes, for this fuel cell stack FS, a cathode-gas (air as an oxidant gas) supply path 31 and exhaust path 32, an anode-gas (a hydrogen gas as a fuel gas) supply path 33 and exhaust gas 34, and a coolant circulation path 35.

As shown in FIGS. 2 and 3, each unit cell FC includes: a membrane electrode structure 2 having a frame 1 therearound; and two separators 3 and 3 between which the frame 1 and the membrane electrode structure 2 are sandwiched.

The frame 1 is integrated with the membrane electrode structure 2 by resin molding (e.g. injection molding). In this embodiment, the frame 1 is in a rectangular shape with the membrane electrode structure 2 in the center. Moreover, the frame 1 has manifold holes H1 to H6, three arranged in one end portion and three in the other. Regions ranging from the manifold groups to the membrane electrode structure 2 correspond to diffuser parts D to be described later.

The membrane electrode structure 2 is generally called an MEA (Membrane Electrode Assembly), and has a structure in which an electrolyte layer made of a solid polymer, for example, is sandwiched between a fuel electrode layer (anode) and an air electrode layer (cathode).

Each of the separators 3 and 3 is in a rectangular shape having substantially the same dimensions as the frame 1 in height and width, and forms cathode-gas flow paths and anode-gas flow paths between itself and the frame 1 and the membrane electrode structure 2. This separator 3 is obtained by pressing a sheet of a metal such as stainless steel, and a center portion corresponding to the membrane electrode structure 2 is formed in a wavy shape in a cross section in the widthwise direction. This wavy shape continues in the lengthwise direction. The projecting portions are in contact with the membrane electrode structure 2 while the recessed portions form the gas flow paths.

Moreover, each separator 3 has the same manifold holes H1 to H6 as the manifold holes H1 to H6 of the frame 1 in both end portions. Regions ranging from the manifold groups to the portion in the wavy cross-sectional shape correspond to the diffuser parts D to be described later.

The frame 1, the membrane electrode structure 2, and the separators 3 and 3 described above are laid over one another to form the unit cell FC. Here, the unit cell FC has, in the center, a power generation part G being the region of the membrane electrode structure 2, as specifically shown in FIG. 3. Moreover, on both sides of the power generation part G, the unit cell FC has manifold parts M and M for supply and exhaust of the reaction gases, and the diffuser parts D and D ranging from the manifold parts M and M to the power generation part G.

In one manifold part M shown on the left side of FIG. 3, the manifold holes H1 to H3 are for supply of the cathode gas (H1), for supply of coolant (H2), and for supply of the anode gas (H3), and form flow paths extending in the stacking direction, respectively. Moreover, in the other manifold part M shown on the right side of FIG. 3, the manifold holes H4 to H6 are for exhaust of the anode gas (H4), for exhaust of the coolant (H5), and for exhaust of the cathode gas (H6), and form flow paths extending in the stacking direction, respectively. Note that the positional relationship between the supply side and the exhaust side may be reversed partly or entirely.

As shown in FIG. 1, the multiple unit cells FC each having the above configuration are stacked with end plates E and E arranged at both ends to form the fuel cell stack FS. In this state, the fuel cell stack FS is pressurized in the stacking direction by an elastic body attached to one of the end plates. In this way, certain contact pressure is applied to each individual unit cell FC, thereby maintaining good gas sealability, electric conductivity, and the like.

In the fuel cell system including the above fuel cell stack FS, the cathode-gas supply path 31 is provided with air supply means 36 such as a compressor and a humidifier 37 which humidifies air supplied from the air supply means 36. Moreover, the cathode-gas exhaust path 32 supplies the water vapor contained in exhaust air to the humidifier 37, and is opened to the atmosphere at a downstream side through a back-pressure regulation valve 38.

On the other hand, the anode-gas supply path 33 reaches the fuel cell stack FS from a hydrogen tank 39, and is provided with a hydrogen regulation valve 40 and a hydrogen pressure sensor 41 in the middle. Moreover, the anode-gas exhaust path 34 reaches a buffer tank 42. Here, the anode gas exhausted from the fuel cell stack FS (an anode off-gas) contains impurity gases such as a nitrogen gas and water vapor. Thus, the anode-gas exhaust path 34 serves to exhaust the anode off-gas to the buffer tank 42.

The buffer tank 42 includes a level sensor 43 for detecting the amount of water accumulated therein, and also includes a water drainage valve 44 for draining the water to the outside and a nitrogen purge valve 45 for releasing the nitrogen gas to the atmosphere.

The coolant circulation path 35 is designed to circulate the coolant (cooling water) cooled by a radiator 46, and includes a cooling-water circulation pump 47, a bypass path 48 bypassing the radiator 46, and a three-way valve 49 connecting the circulation path 35 and the bypass path 48. Moreover, the fuel cell stack FS is provided with stack-temperature detection means (temperature sensor) 50 for detecting the internal temperature thereof.

Further, the fuel cell system includes a controller 51 for controlling the air supply means 36, the hydrogen regulation valve 40, the water drainage valve 44, the nitrogen purge valve 45, the cooling-water circulation pump 47, the three-way valve 49, and so on.

This controller 51 stores therein control programs for various types of devices. Specifically, the controller 51 includes: a startup control unit 52 for executing the operating method of the present invention; and a timer 53 which measures the length of time the system is left unused since it is stopped. Moreover, the controller 51 receives detection signals from the hydrogen pressure sensor 41, the level sensor 43, and the stack-temperature detection means 50, as well as the current value of the fuel cell stack FS, the current value of each unit cell FC, and so on.

The startup control unit 52 stores therein data indicating the relationship between the temperature of the fuel cell stack FS and the amount of the impurity gases generated and the relationship between the temperature of the fuel cell stack FS and the permeability of the nitrogen gas from the cathode side to the anode side, as well as a supply pressure map for the anode gas. The supply pressure map serves as a reference based on which the supply pressure of the anode gas is set so that the supply pressure of the anode gas will be suitable for the temperature of or load on the fuel cell stack FS.

Here, for the fuel cell system, the temperature range of the fuel cell stack FS is expected to be −20 to 80° C. by taking into account the operating temperature of the fuel cell stack FS (approximately 80° C.) and that the system may be stopped in a below-freezing environment and left unused for a long period of time. Moreover, fuel cell systems have been known to have a tendency that the permeability of the nitrogen gas to the anode side increases as the temperature of the fuel cell stack FS increases. The permeability of the nitrogen gas is, to be more precise, the speed of permeation of the nitrogen gas from the cathode side to the anode side in a unit cell FC. As this speed increases, the amount of the permeation of the nitrogen gas increases, and thereby the concentration of the nitrogen gas on the anode side increases.

For this reason, if the temperature of the fuel cell stack FS is known, it is possible to estimate the permeability of the nitrogen gas to the anode side at that point of time. Moreover, it is also possible to estimate indirectly the temperature of the fuel cell stack FS at the time of startup, the concentration of the nitrogen gas, and the permeability of the nitrogen gas on the basis of the ambient temperature, the length of time the system has been stopped, and the like, in addition to the temperature of the fuel cell stack FS.

In this respect, the startup control unit 52 of the controller 51 has a function of estimating the nitrogen-gas concentration inside the buffer tank 42 (impurity-gas concentration estimation means) and a function of estimating the permeability of the nitrogen gas from the cathode side to the anode side in the fuel cell stack FS (nitrogen-gas permeability estimation means). In other words, the startup control unit 52 estimates the initial concentration of the nitrogen gas and the permeability of the nitrogen gas by utilizing various kinds of data previously stored.

In the operating method of the fuel cell system having the above configuration, the amplitude or cycle of pulsation of the supply pressure of the anode gas to the fuel cell stack FS is set in accordance with the permeability of the nitrogen gas from the cathode side to the anode side. Specifically, the larger the permeability of the nitrogen gas becomes, the higher the amplitude of the pulsation is made. Alternatively, the larger the permeability of the nitrogen gas becomes, the shorter the cycle of the pulsation is made. Moreover, control is performed such that the supply pressure of the anode gas to the fuel cell stack FS remains constant in a case where the permeability of the nitrogen gas from the cathode side to the anode side is equal to or smaller than a predetermined value.

More specifically, the operating method of the fuel cell system uses the functions of the startup control unit 52, i.e. the impurity-gas concentration estimation means and the nitrogen-gas permeability estimation means to perform control such that the supply pressure of the anode gas to the fuel cell stack FS remains constant in a case where the initial nitrogen-gas concentration inside the buffer tank 42 is equal to or greater than a predetermined value and where the permeability of the nitrogen gas from the cathode side to the anode side in the fuel cell stack FS is equal to or smaller than a predetermined value.

Moreover, as a more preferred embodiment, the operating method of the fuel cell system uses the stack-temperature detection means 50, which detects the temperature of the fuel cell stack, in such a way as to perform control such that the supply pressure of the anode gas to the fuel cell stack FS remains constant in a case where the temperature of the fuel cell stack FS is equal to or smaller than a predetermined value, in addition to the control described above.

Further, as a more preferred embodiment, the operating method of the fuel cell system uses the timer 53, which measures the length of time the system is left unused since it is stopped, in such a way as to perform control such that the supply pressure of the anode gas to the fuel cell stack FS remains constant in a case where the unused period of time is equal to or greater than a predetermined value, in addition to the above controls.

Next, the operating method of the fuel cell system described above will be described more specifically based on a flowchart shown in FIG. 4. The fuel cell system described above is designed to cope with a problem that occurs upon startup from a state where a large amount of impurity gases remains inside the fuel cell stack FS, e.g. to cope with back flow of the impurity gases due to the pulsation of the supply pressure of the anode gas upon startup after the system is left unused for a long period of time. Thus, in the following embodiment of the operating method, the unused period of time is determined first.

In the operating method of the fuel cell system shown in FIG. 4, after startup of the system, it is determined in step S1 whether or not the unused period of time since the system is stopped measured with the timer 53 is equal to or greater than a predetermined value. Here, first predetermined value and second predetermined value in FIG. 4 are set based on the data stored in the startup control unit 52, specifically, the data indicating the relationship between the temperature of the fuel cell stack FS and the permeability of the nitrogen gas.

If the unused period of time is smaller than the first predetermined value (No) in step S1, the amount of the impurity gases remaining inside the fuel cell stack FS is considered to be small. Then, the method proceeds to step S8 to perform control that causes the pulsation of the supply pressure of the anode gas. As a result, the anode gas is supplied to the fuel cell stack FS while the nitrogen gas having permeated from the cathode side to the anode side is exhausted to the buffer tank 42.

On the other hand, if the unused period of time is equal to or greater than the first predetermined value (Yes) in step S1, the amount of the impurity gases remaining inside the fuel cell stack FS is considered to be large. Then, the method proceeds to the next step S2 to set the supply pressure of the anode gas to the fuel cell stack FS.

In step S2, startup pressure control is performed to set the supply pressure of the anode gas such that the impurity gases inside the fuel cell stack FS can be exhausted to the buffer tank 42. In this case, the supply pressure is set at pressure greater than the upper limit pressure of the pulsation which would be performed if it were determined in step S1 to perform the pulsation control, for example. Moreover, the pressure value is determined by taking into account the proportions of the volumes of anode flow paths, specifically, the ratio between the volume of the anode flow path in the fuel cell stack FS and the volume of the anode flow path in the buffer tank 42. For example, in a case where the ratio between the volume on a side upstream of the downstream end of the anode flow path in the fuel cell stack FS and the volume on a side downstream of the downstream end is 1:1, the hydrogen gas is supplied at pressure twice higher than the initial anode pressure.

In step S3, the temperature of the fuel cell stack FS is detected with the stack-temperature detection means 50. Then, in step S4, from the temperature of the fuel cell stack FS detected with the stack-temperature detection means 50, the amount of permeation of the impurity gas (the nitrogen gas), i.e., the permeability of the impurity gas (the nitrogen gas), per unit time at that temperature is calculated by the startup control unit 52.

In step S5, the permeability of the nitrogen gas calculated in step S4 is integrated continuously to calculate the total amount of permeation of the impurity gas (the nitrogen gas) to be accumulated in the anode flow path. Specifically, because the anode flow path in the fuel cell stack FS has already been filled with the hydrogen gas by the control in step S2, the initial amount of the impurity gas (the nitrogen gas) is set at 0 cc. If the temperature of the fuel cell stack FS at that point of time indicates the permeability is 0.1 cc/sec, that permeability is multiplied by the cycle of the calculation and added to the initial value. Thereafter, the amount of permeation of the impurity gas is integrated in the same manner. Here, the initial amount of the impurity gas may be set at a value greater than 0 cc with a safety factor taken in consideration.

In step S6, it is determined whether or not the total amount of permeation of the impurity gas (the nitrogen gas) (the integrated amount of permeation of the impurity gas) calculated in step S5 is equal to or smaller than the second predetermined value. If the total amount is equal to or smaller than the second predetermined value (Yes), the method proceeds to step S7 to perform control such that the supply pressure of the anode gas remains constant. Specifically, the hydrogen regulation valve 40 is subjected to feedback control such that the detection value of the hydrogen pressure sensor 41 remains constant. On the other hand, if the total amount calculated in step S5 exceeds the second predetermined value (No), the method proceeds to step S8 to perform control that causes the pulsation of the supply pressure of the anode gas.

Further, in the operating method of the fuel cell system, steps S3 to S7 shown in FIG. 4 are repeated. Once it is determined as "No" in step S6, the method shifts from the control that makes the supply pressure of the anode gas remain constant (step S7) to the control that causes the pulsation of the supply pressure (step S8). Moreover, as shown in Part (A) of FIG. 5 illustrating changes in the supply pressure of the anode gas, the supply pressure of the anode gas to the fuel cell stack FS is caused to pulsate after the elapse of a predetermined period of time T from the startup.

When the fuel cell system is started in the above manner, the hydrogen concentration of the anode gas in the fuel cell stack FS increases. Moreover, as shown in Part (B) of FIG. 5, the temperature of the fuel cell stack FS increases in response to the progress in power generation.

As shown in Part (C) of FIG. 5, the concentration of the nitrogen gas inside the buffer tank 42 decreases in response to the increase in the supply pressure of the hydrogen gas. This is because the impurity gases (mainly the nitrogen gas) inside the fuel cell stack FS are substituted with the hydrogen gas, and the hydrogen gas and the impurity gases, pushed out by it, in the buffer tank 42 are exhausted to the outside through the nitrogen purge valve 45.

As shown in Part (D) of FIG. 5, the concentration of the nitrogen gas inside the fuel cell stack FS decreases in response to the increase in the supply pressure of the anode gas. After the supply pressure reaches a predetermined value, the concentration of the nitrogen gas inside the fuel cell stack FS slightly increases due to an increase in the permeability of the nitrogen gas caused by the increase in the temperature of the fuel cell stack FS, but thereafter comes to show regular increases and decreases due to the subsequent pulsating operations. In other words, the nitrogen gas inside each unit cell FC is exhausted regularly.

As described above, the operating method of the fuel cell system in the above embodiment involves: estimating the concentration of the impurity gas inside the buffer tank 42 and the permeability of the nitrogen gas in the fuel cell stack FS; and performing the control that makes the supply pressure of the anode gas remain constant, or the control that causes the pulsation of the supply pressure. Accordingly, at the time of startup after a long unused period in particular, the back flow of the impurity gases from the buffer tank 42 is prevented, thereby enabling the removal of the impurity gases while securing the hydrogen-gas concentration inside the fuel cell stack FS. Moreover, with the above method that involves the estimation of the impurity-gas concentration and the nitrogen-gas permeability, the control can be performed with a minimum amount of sensors and the like. Accordingly, the method can contribute also to the simplification of the system structure and the like. Moreover, because unnecessary pulsation does not occur at startup, the method can suppress degradation in the mechanical strength of the membrane electrode structure constituting each unit cell.

Meanwhile, in the case of a fuel cell system including a fuel cell stack FS formed of many unit cells FC, the unit cells FC may vary from one another in terms of the amount of residual water that is condensed on the anode side in an environment where a large amount of impurity gases remains inside the fuel cell stack FS. If the back flow of the impurity gases occurs in this situation due to the pulsation of the supply pressure of the anode gas, those unit cells FC with a larger amount of residual water more obviously run short of hydrogen partial pressure at an anode-gas outlet side.

In contrast, in the operating method of the fuel cell system described above, the control that makes the supply pressure of the anode gas remain constant is performed at startup, in other words, the control that causes the pulsation of the supply pressure is not performed immediately after startup. Thus, even when the unit cells FC vary from one another in terms of the amount of the residual water, no back flow of the impurity gases from the buffer tank 42 occurs, so that the impurity gases containing the residual water is exhausted smoothly by the anode gas. This solves the shortage of the hydrogen partial pressure resulting from variations in pressure drop among the unit cells FC. Accordingly, it is possible to prevent voltage drop of the unit cells FC and degradation of the unit cells FC.

Moreover, in the operating method of the fuel cell system, the supply pressure of the anode gas is controlled based on the temperature of the fuel cell stack FS. Accordingly, it is possible to perform accurate control in accordance with the state of the fuel cell stack FS at startup. Further, in the operating method of the fuel cell system, the supply pressure of the anode gas is controlled based on the period of time the system is left unused since it is stopped. This also makes it possible to perform accurate control in accordance with the state of the fuel cell stack FS at startup.

Furthermore, in the operating method of the fuel cell system, the supply pressure of the anode gas to the fuel cell stack is caused to pulsate after the elapse of the predetermined period of time T from startup. Specifically, the control is shifted from the one that makes the supply pressure of the anode gas remain constant to the one that causes the pulsation of the supply pressure, on the basis of the temperature of the fuel cell stack. Accordingly, the nitrogen gas having permeated from the cathode side to the anode side in the fuel cell stack FS is exhausted quickly.

Note that in each unit cell FC, the nitrogen gas permeates from the cathode side to the anode side, and the unit cell FC falls into a state where the nitrogen gas after the permeation is likely to remain around the catalyst layer on the anode side. To solve this, the fuel cell system described above shifts the control from the one that makes the supply pressure of the anode gas remain constant to the one that causes pulsation of the supply pressure pulsate. Accordingly, the nitrogen gas having permeated to the anode side is quickly exhausted, thereby securing the anode-gas concentration on the surface of the catalyst layer on the anode side.

In the operating method of the fuel cell system of the present invention according to the embodiment described above, the control that makes the supply pressure of the anode gas remain constant is performed when the total amount of the permeation of the impurity gas is equal to or smaller than the second predetermined value in step S6 in the flowchart shown in FIG. 4. Alternatively, it is possible to perform control that sets the amplitude or cycle of the pulsation of the supply pressure of the anode gas.

Specifically, as another embodiment, the operating method of the fuel cell system of the present invention can perform control that sets the amplitude or cycle of the pulsation of the supply pressure of the anode gas in accordance with the permeability of the impurity gas, besides the one that makes the supply pressure remain constant as described above. In this case, the permeability of the impurity gas may be substituted with the amount of permeation per unit time or the total amount for a predetermined period of time. Specifically, the larger the permeability of the impurity gases becomes, the higher the amplitude of pulsation of the supply pressure of the anode gas is made. Alternatively, the larger the permeability of the impurity gases becomes, the shorter the cycle of pulsation of the supply pressure of the anode gas is made. These configurations can also achieve similar operations and effects to those of the foregoing embodiment.

As still another embodiment of the operating method of the fuel cell system according to the present invention, it is possible to use tank hydrogen-gas detection means 54 for detecting the concentration of the hydrogen gas inside the buffer tank 42 as indicated with a dot line in FIG. 1, instead of the impurity-gas concentration estimation means of the startup control unit 52. For the tank hydrogen-gas detection means 54, a hydrogen concentration sensor is used, for example. In this case, in step S3 in FIG. 4, the determining of an estimated concentration of the impurity gas inside the buffer tank 42 is performed by use of the detected hydrogen concentration. In this case, if the hydrogen concentration is equal to or smaller than a predetermined value (e.g. 30%), it is, then, possible to consider that the nitrogen concentration is equal to or greater than a predetermine value (e.g. 70%).

Moreover, as yet another embodiment of the operating method of the fuel cell system according to the present invention, it is possible to use cell hydrogen-gas detection means 55 for detecting the concentration of the hydrogen gas in the anode side of the fuel cell stack FS as indicated with a dot line in FIG. 1, instead of the nitrogen-gas permeability estimation means of the startup control unit 52. For the cell hydrogen-gas detection means 55, a hydrogen concentration sensor is used, for example. In this case, in step S3 in FIG. 4, an estimated permeability of the nitrogen gas from the cathode side to the anode side in the fuel cell stack FS is determined instead of the detected concentration of the hydrogen gas. Note that similar effects can be achieved by using a nitrogen concentration sensor instead of the hydrogen concentration sensor.

These embodiments can achieve the same operations and effects as those of the foregoing embodiment. Moreover, since the hydrogen-gas concentration inside the buffer tank 42 or the fuel cell stack FS is actually measured with the tank hydrogen-gas detection means 54 or the cell hydrogen-gas detection means 55, it is possible to perform accurate control in accordance with the state of the fuel cell stack at startup.

Note that the operating method of the fuel cell system of the present invention, including the configuration of the fuel cell system, is not limited to the above-described embodiments. Minor features of the configurations can be changed as appropriate without departing from the gist of the present invention.

REFERENCE SIGNS LIST

FC unit cell
FS fuel cell stack
42 buffer tank
52 startup control unit (impurity-gas concentration estimation means, nitrogen-gas permeability estimation means)
50 stack-temperature detection means
53 timer
54 tank hydrogen-gas detection means
55 cell hydrogen-gas detection means

The invention claimed is:

1. An operating method of a fuel cell system of a non anode-gas circulation type that includes: a fuel cell stack formed by stacking a plurality of unit cells; and a buffer tank for exhausting, to an outside, an impurity gas contained in an anode off-gas exhausted from the fuel cell stack, and the fuel cell system having a structure in which the impurity gas inside the fuel cell stack is pumped to the buffer tank, the operating method comprising the steps of:
    estimating a concentration of the impurity gas inside the buffer tank;
    estimating a permeability of nitrogen gas from a cathode side to an anode side in the fuel cell stack; and
    performing control such that
        a supply pressure of an anode gas to the fuel cell stack remains constant in a case where the concentration of the impurity gas inside the buffer tank is equal to or greater than a predetermined value, and where the permeability of the nitrogen gas from the cathode side to the anode side in the fuel cell stack is equal to or smaller than a predetermined value; and
        the supply pressure of anode gas to the fuel cell stack is pulsated to pump the impurity gas inside the fuel cell stack to the buffer tank in a case where the concentration of the impurity gas inside the buffer tank is lower than the predetermined value, or where the permeability of the nitrogen gas from the cathode side to the anode side in the fuel cell stack is larger than the predetermined value.

2. The operating method of a fuel cell system according to claim 1, wherein by using a stack-temperature sensor for detecting a temperature of the fuel cell stack, the control is performed such that the supply pressure of the anode gas to the fuel cell stack remains constant in a case where the temperature of the fuel cell stack is equal to or smaller than a predetermined value.

3. The operating method of a fuel cell system according to claim 2, wherein by using a timer for measuring a period of time the fuel cell system is left unused after stopped, the control is performed such that the supply pressure of the anode gas to the fuel cell stack remains constant in a case where the unused period of time is equal to or greater than a predetermined value.

4. The operating method of a fuel cell system according to claim 1, wherein by using a stack-temperature sensor for detecting a temperature of the fuel cell stack, the control is shifted from one that makes the supply pressure of the anode gas to the fuel cell stack remain constant to another that causes pulsation of the supply pressure of the anode gas, once the temperature of the fuel cell stack reaches or exceeds a predetermined value.

5. The operating method of a fuel cell system according to claim 1, wherein by using a hydrogen concentration sensor for detecting a concentration of a hydrogen gas inside the buffer tank, an estimated concentration of the impurity gas inside the buffer tank is calculated and determined from the detected concentration of the hydrogen gas inside the buffer tank.

6. The operating method of a fuel cell system according to claim 1, wherein by using a hydrogen concentration sensor for detecting a concentration of the hydrogen gas in the anode side of the fuel cell stack, the estimated permeability of the nitrogen gas from the cathode side to the anode side in the fuel cell stack is calculated and determined from the detected concentration of the hydrogen gas in the anode side of the fuel cell stack.

7. The operating method of a fuel cell system according to claim 1, wherein the supply pressure of the anode gas to the fuel cell stack is caused to pulsate after an elapse of a predetermined period of time from startup.

* * * * *